United States Patent
Hosp

(10) Patent No.: US 10,504,121 B2
(45) Date of Patent: Dec. 10, 2019

(54) SYSTEMS AND METHODS FOR TRANSMITTING MESSAGES THROUGH PERSONAL COMMUNICATION NETWORKS

(71) Applicant: MasterCard International Incorporated, Purchase, NY (US)

(72) Inventor: Adam K. Hosp, Lake St. Louis, MO (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 562 days.

(21) Appl. No.: 14/737,028

(22) Filed: Jun. 11, 2015

(65) Prior Publication Data

US 2015/0363779 A1    Dec. 17, 2015

Related U.S. Application Data

(60) Provisional application No. 62/012,102, filed on Jun. 13, 2014.

(51) Int. Cl.
| | |
|---|---|
| G06Q 40/00 | (2012.01) |
| G06Q 20/40 | (2012.01) |
| G06Q 20/32 | (2012.01) |

(52) U.S. Cl.
CPC ......... G06Q 20/405 (2013.01); G06Q 20/322 (2013.01)

(58) Field of Classification Search
CPC ............................ G06Q 20/405; G06Q 20/322
See application file for complete search history.

(56) References Cited

U.S. PATENT DOCUMENTS

| 7,921,038 B2 | 4/2011 | Matsuda et al. |
| 8,473,353 B2 | 6/2013 | Matsuda et al. |
| (Continued) | | |

FOREIGN PATENT DOCUMENTS

| WO | 2008156887 A1 | 12/2008 |
| WO | 2011139643 A1 | 11/2011 |

OTHER PUBLICATIONS

"Varage Sale" App for Android and iOS, https://play.google.com/store/apps/details?id=com.codified.hipyard (accessed May 14, 2015).

(Continued)

*Primary Examiner* — Scott S Trotter
(74) *Attorney, Agent, or Firm* — Armstrong Teasdale LLP

(57) ABSTRACT

A method and system for purchase transactions using a personal communication network are provided. The method includes receiving registration data for a seller to use a payment platform, receiving item information relating to an item for sale, and receiving a selection of at least one of one or more messaging accounts associated with the seller and one or more of a plurality of personal communication network accounts associated with the seller. The method also includes generating an address of a hosted website configured to display item information and transmitting the generated address to the one or more of the personal communication network accounts. The method further includes receiving an authorization to pay the seller from a consumer account and transferring value from a consumer account to a seller account within the payment platform.

16 Claims, 18 Drawing Sheets

(56) References Cited

U.S. PATENT DOCUMENTS

| | | | |
|---|---|---|---|
| 8,688,570 | B2 | 5/2014 | Jones et al. |
| 9,135,612 | B1* | 9/2015 | Proctor, Jr. ........... G06Q 20/202 |
| 2001/0037262 | A1 | 11/2001 | Seto |
| 2006/0015435 | A1* | 1/2006 | Nathanson ........... G06Q 20/401 |
| | | | 705/37 |
| 2007/0011104 | A1 | 1/2007 | Leger et al. |
| 2007/0250396 | A1* | 10/2007 | Hallowell ............... G06Q 30/06 |
| | | | 705/26.3 |
| 2009/0254971 | A1* | 10/2009 | Herz ....................... G06Q 10/10 |
| | | | 726/1 |
| 2011/0289149 | A1* | 11/2011 | Shmueli ................. G06Q 10/10 |
| | | | 709/205 |
| 2013/0090998 | A1 | 4/2013 | Shimogori |
| 2014/0019362 | A1 | 1/2014 | Bhagavatula et al. |
| 2014/0019365 | A1 | 1/2014 | Fallows et al. |
| 2014/0100988 | A1 | 4/2014 | Marx |
| 2014/0164229 | A1 | 6/2014 | Jones et al. |
| 2014/0279131 | A1 | 9/2014 | Sullivan et al. |

OTHER PUBLICATIONS

"OfferUp" App for Android and iOS, https://offerupnow.com/howitworks/ (accessed May 14, 2015).
"Shpock" App for Android and iOS, https://play.google.com/store/apps/details?id=com.shpock.android (accessed May 14, 2015).
"HappySale" App for Android and iOS, https://play.google.com/store/apps/details?id=com.happysale (accessed May 14, 2015).
"Carousell" App for Android and iOS, https://play.google.com/store/apps/details?id=com.thecarousell.Carousell (accessed May 14, 2015).
International Search Report and Written Opinion, dated Sep. 17, 2015, for co-pending International application No. PCT/US2015/035463 (14 pgs.).

* cited by examiner

SYSTEMS AND METHODS FOR TRANSMITTING MESSAGES THROUGH PERSONAL COMMUNICATION NETWORKS

CROSS REFERENCE TO RELATED APPLICATIONS

This application claims priority to and the benefit of the filing date of U.S. Provisional Application No. 62/012,102 filed on Jun. 13, 2014, which is hereby incorporated by reference in its entirety.

BACKGROUND

This disclosure relates generally to initiating purchase transaction through personal communication networks such as social media networks and payment transactions through a peer-to-peer payment platform and, more particularly, to computer systems and computer-based methods for facilitating purchase transactions using personal communication networks.

Various transaction platforms exist for sellers to sell products or services via the Internet. The transaction platforms usually exist as websites that consumers are required to navigate to and perform purchase transactions while on that website. The transaction platforms may include an integral method of payment or may also link the consumer to a preferred third party payment website to complete the payment portion of the transaction. Typically, such transaction platforms require sellers to be registered with the website that is displaying the goods or services being offered by the sellers and/or the third party payment website being used to facilitate payments by consumers of such goods or services being offered. Such registration processes are often lengthy and require approval after a time period that may last hours or days. Additionally, the payment websites typically require more information than is necessary for consumer verification purposes.

BRIEF DESCRIPTION OF THE DRAWINGS

FIG. 1 is a schematic diagram illustrating a personal media sales system communicatively coupled to a multi-party payment processing system.

FIG. 2 is a simplified block diagram of an example system including a plurality of computer devices in accordance with one example embodiment of the present disclosure.

FIG. 3 is an expanded block diagram of an example embodiment of a server architecture of the system including the plurality of computer devices in accordance with one example embodiment of the present disclosure.

FIG. 4 illustrates an example configuration of a client system shown in FIGS. 2 and 3.

FIG. 5 illustrates an example configuration of a server system shown in FIGS. 2 and 3.

FIG. 6 illustrates computer-based method for processing purchase transactions using a personal communication network.

FIG. 7 is a screen capture of a splash page for a transaction module used for selling items by a seller through messaging accounts and personal communication networks associated with the seller.

FIG. 8 is a screen capture of a menu page for the transaction module.

FIG. 9 is a screen capture of an "add new product" page for the transaction module.

FIG. 10 is a screen capture of a new product entry page for the transaction module.

FIG. 11 is a screen capture of a camera view for the transaction module.

FIG. 12 is a screen capture of a completed page for adding a new product for sale using the transaction module.

FIG. 13 is a screen capture of a share listing page for the transaction module.

FIG. 14 is a screen capture of share selection page for the transaction module.

FIG. 15 is a screen capture of listing display page for the transaction module.

FIG. 16 is a screen capture of a sales feed page for the transaction module.

FIG. 17 shows a configuration of database within database server of server system with other related server components.

FIG. 18 is a schematic block diagram of personal media sales system in accordance with an example embodiment of the present disclosure.

DETAILED DESCRIPTION

Figure 1:
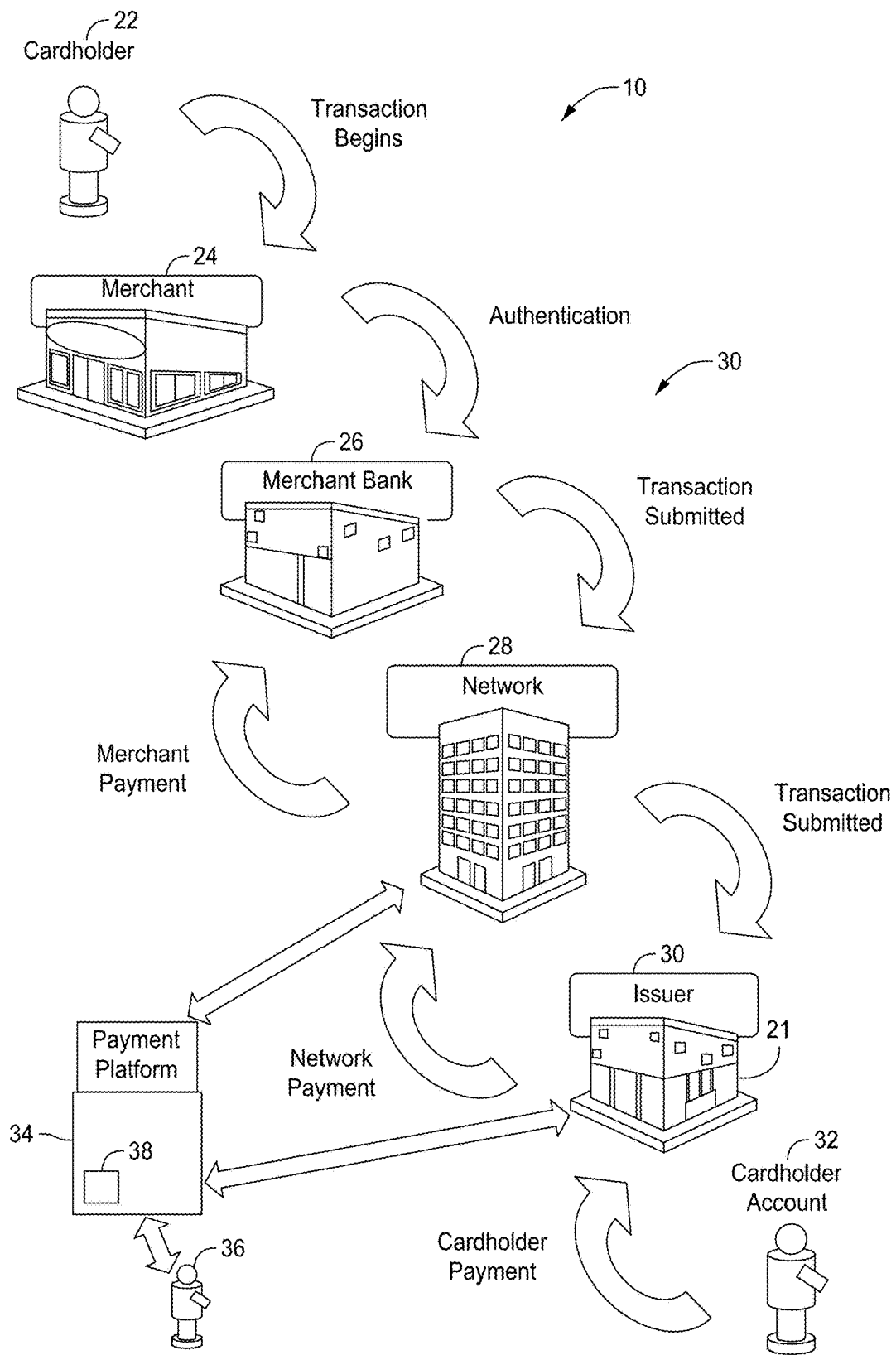
FIGS. 1-18 show example embodiments of the methods and systems described herein.

Embodiments of the methods and systems described herein relate to a communication network linking sellers of items or services to potential purchasers of those items or services. The system includes computer code (i.e., an application) executing on or in cooperation with a seller computer device that receives information relating to an item ("item information") the seller has for sale. As used herein, the item the seller has for sale may be a physical item, such as, a product or may be a service. The seller enters the item information through an application executing on the seller computer device. The seller computer device can be a wireless handheld device or a desktop-type personal computer (PC) that has access to a payment platform and/or transaction module of a payment card network. The payment card network manages the data handling and the financial transaction relating to a sale between the sellers of items or services to potential purchasers of those items or services. The seller also enters a selection of personal communication network outlets where the seller wants to post a URL link for the item for sale. The personal communication network may include typical social media sites in addition to the seller's email and SMS messaging accounts. The payment card network, utilizing the payment platform and/or transaction module, generates a webpage based on the item information and transmits the URL to either the seller or to the contacts contained in the personal communication network provider by the seller, which may include typical social media sites in addition to the seller's email and SMS messaging accounts.

The seller can also control whether the messages transmitted to the seller's contacts including the URL can be forwarded on by the sellers contacts or not. Permitting forwarding of the messages provides for a wider dissemination of the URL, however, a downside to this wider dissemination is contact with potential purchasers that the seller may not know. The seller's contacts respond to the posting of the URL by interacting with an Internet webpage where the URL directs the seller's contacts. The webpage includes the item information the seller has for sale in addition to information and/or a link to a method of payment for the item. A payment platform receives the seller's contact authorization to pay for the associated item, the payment of which is then credited to the seller.

A plurality of sellers may use the payment card network to manage items they have for sale simultaneously. Payment card network includes databases that store item information for each item each seller has for sale. When one or more of seller's contact respond to the webpage to purchase the item, the payment card network manages the financial transaction. For example, the payment card network through the payment platform and/or transaction module may prompt the purchaser for a method the purchaser intends to use to pay for the item. The payment card network may also prompt the purchaser for signup information if the purchaser would like to sign-up with a payment system associated with the payment card network. If not, other forms of payment may be processed through payment card network for the seller. After which, the funds are deposited into an account of the seller.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, smartphones, personal digital assistants (PDAs), key fobs, and/or computers. Each type of transactions card can be used as a method of payment for performing a transaction.

In one embodiment, a computer program is provided, and the program is embodied on a computer readable medium. In an example embodiment, the system is executed on a single computer system, without requiring a connection to a sever computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of AT&T located in New York, N.Y.). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The following detailed description illustrates embodiments of the disclosure by way of example and not by way of limitation. It is contemplated that the disclosure has general application to processing financial transaction data by a third party in industrial, commercial, and residential applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, merchant refers to a participant in the multi-party payment card network who is able to receive payment card information from a consumer and request an authorization from the payment card network. A seller refers to an entity, not necessarily a participant in the multi-party payment card network, such as, but not limited to, an individual or business, that offers an item or service for sale through an application communicable with the payment card network through a payment platform.

FIG. 1 is a schematic diagram illustrating a personal media sales system 10 communicatively coupled to a multi-party payment processing system 20. Typically, multi-party payment processing system 20 is used for, among other things, enabling ordinary payment-by-card transactions in which merchants 24 and card issuers 30 do not need to have a one-to-one special relationship. In the example embodiment, personal media sales system 10 includes components described herein below that facilitate personal sales between sellers who are not necessarily a party of multi-party payment processing system 20 and buyers who are typically personal contacts of the seller. Embodiments described herein may relate to a payment card system, such as a payment card network operated by MasterCard International Incorporated. The payment card network, as described herein, is a four-party payment card network that includes a plurality of special purpose processors and data structures stored in one or more memory devices communicatively coupled to the processors, and a set of proprietary communications standards promulgated by MasterCard International Incorporated for the exchange of financial transaction data and the settlement of funds between financial institutions that are members of the payment card network. As used herein, financial transaction data includes a unique account number associated with a cardholder using a payment card issued by an issuer, purchase data representing a purchase made by the cardholder, including a type of merchant, amount of purchase, date of purchase, and other data, which may be transmitted between any parties of multi-party payment processing system 20.

In a typical payment card system, a financial institution called the "issuer" issues a payment card, such as a credit card, to a consumer or cardholder 22, who uses the payment card to tender payment for a purchase from a merchant 24. To accept payment with the payment card, merchant 24 must normally establish an account with a financial institution that is part of the financial payment processing system. This financial institution is usually called the "merchant bank," the "acquiring bank," or the "acquirer." When cardholder 22 tenders payment for a purchase with a payment card, merchant 24 requests authorization from a merchant bank 26 for the amount of the purchase. The request may be performed over the telephone, but is usually performed through the use of a point-of-sale terminal, which reads cardholder's 22 account information from a magnetic stripe, a chip, or embossed characters on the payment card and communicates electronically with the transaction processing computers of merchant bank 26. Alternatively, merchant bank 26 may authorize a third party to perform transaction processing on its behalf. In this case, the point-of-sale terminal will be configured to communicate with the third party. Such a third party is usually called a "merchant processor," an "acquiring processor," or a "third party processor."

Using a payment card network 28, computers of merchant bank 26 or merchant processor will communicate with computers of an issuer bank 30 to determine whether cardholder's 22 account 32 is in good standing and whether the purchase is covered by cardholder's 22 available credit line. Based on these determinations, the request for authorization will be declined or accepted. If the request is accepted, an authorization code is issued to merchant 24.

When a request for authorization is accepted, the available credit line of cardholder's 22 account 32 is decreased. Normally, a charge for a payment card transaction is not posted immediately to cardholder's 22 account 32 because bankcard associations, such as MasterCard International Incorporated®, have promulgated rules that do not allow merchant 24 to charge, or "capture," a transaction until goods are shipped or services are delivered. However, with respect to at least some debit card transactions, a charge may be posted at the time of the transaction. When merchant 24 ships or delivers the goods or services, merchant 24 captures the transaction by, for example, appropriate data entry procedures on the point-of-sale terminal. This may include bundling of approved transactions daily for standard retail purchases. If cardholder 22 cancels a transaction before it is captured, a "void" is generated. If cardholder 22 returns goods after the transaction has been captured, a "credit" is generated. Payment card network 28 and/or issuer bank 30 stores the financial transaction data, such as a type of merchant, amount of purchase, date of purchase, in a database 120 (shown in FIG. 2).

For debit card transactions, when a request for a PIN authorization is approved by the issuer, the consumer's account is decreased. Normally, a charge is posted immediately to a consumer's account. The issuer 30 then transmits the approval to the merchant bank 26 via payment card network 28, with ultimately the merchant 24 being notified for distribution of goods/services, or information or cash in the case of an ATM.

After a purchase has been made, a clearing process occurs to transfer additional transaction data related to the purchase among the parties to the transaction, such as merchant bank 26, payment card network 28, and issuer bank 30. More specifically, during and/or after the clearing process, additional data, such as a time of purchase, a merchant name, a type of merchant, item information, account information of cardholder 22, a type of transaction, item information, and/or other suitable information, is associated with a transaction and transmitted between parties to the transaction as transaction data, and may be stored by any of the parties to the transaction.

After a transaction is authorized and cleared, the transaction is settled among merchant 24, merchant bank 26, and issuer bank 30. Settlement refers to the transfer of financial data or funds among merchant's 24 account, merchant bank 26, and issuer bank 30 related to the transaction. Usually, transactions are captured and accumulated into a "batch," which is settled as a group. More specifically, a transaction is typically settled between issuer bank 30 and payment card network 28, and then between payment card network 28 and merchant bank 26, and then between merchant bank 26 and merchant 24.

Payment card network 28 is also configured to interface with a payment platform 34 configured to process payments between a seller and a consumer 36 that is not necessarily a cardholder 22 having an account 32. Payment platform 34 permits transactions that would otherwise be conducted using cash or other payment methods to being conducted using payment card network 28. A transaction module 38 is configured to operate in conjunction with payment platform 34 to receive item information and to transmit the item information to personal communication network outlets selected and controlled by the seller. In one embodiment, the seller is not necessarily cardholder 22 or merchant 24.

Figure 2:
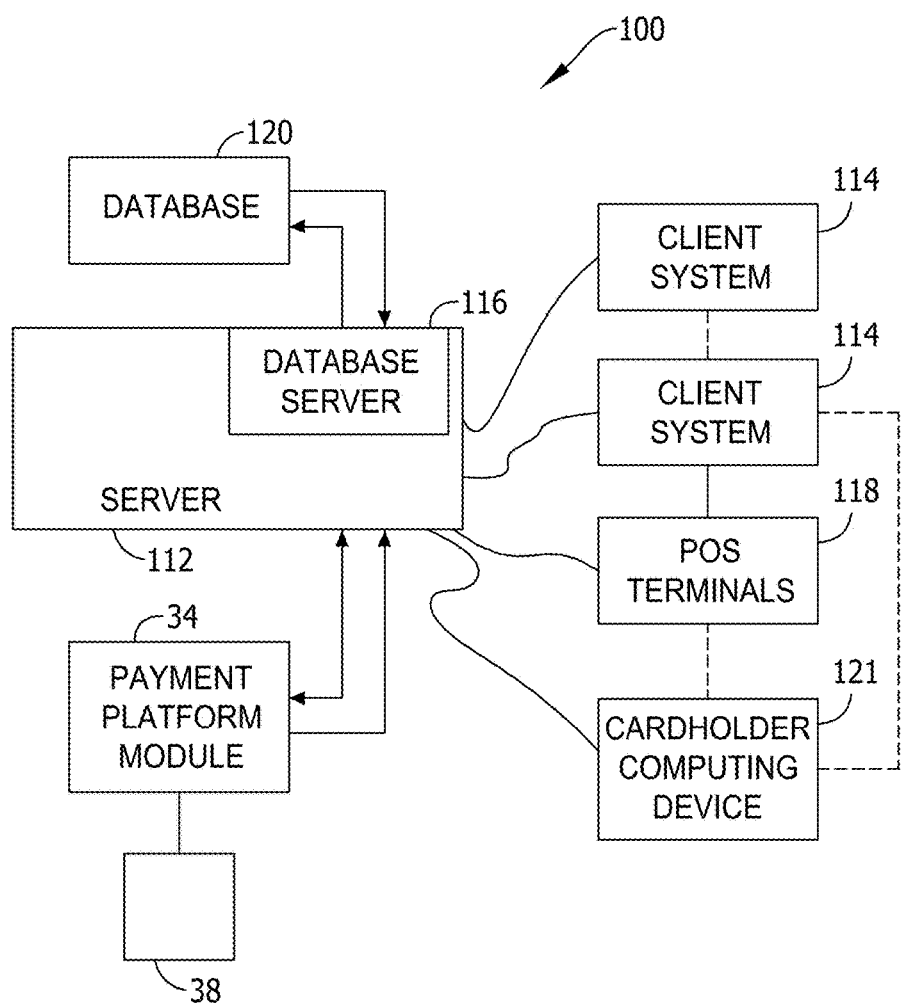

FIG. 2 is a simplified block diagram of an example processing system 100 including a plurality of computer devices, such as server system 112, client systems 114, payment platform 34, transaction module 38, and cardholder computing device 121 in accordance with one embodiment of the present disclosure. In one embodiment payment system 100 implements a process to validate a payment card transaction. More specifically, payment platform 34 in communication with server system 112 is configured to receive item information, and store the item information in, for example, database 120 with other item information for other items for sale, if any. Payment platform 34 is also configured to transmit the item information to selectable personal communication network outlets associated with the seller. In some embodiments, the personal communication network outlet privacy and or publication options control the dissemination of the item information to consumers associated with the seller. In other embodiments, transaction module 38 and/or payment platform 34 interact with the selected personal communication network outlets to control the dissemination of the item information. Payment platform 34 is further configured to enable selling of products and services over personal communication network outlets.

More specifically, in the example embodiment, system 100 includes a server system 112, and a plurality of client sub-systems, also referred to as client systems 114, connected to server system 112. In one embodiment, client systems 114 are computers including a web browser, such that server system 112 is accessible to client systems 114 using the Internet. Client systems 114 are interconnected to the Internet through many interfaces including a network, such as a local area network (LAN) or a wide area network (WAN), dial-in-connections, cable modems, and special high-speed Integrated Services Digital Network (ISDN) lines. Client systems 114 could be any device capable of interconnecting to the Internet including a web-based phone, PDA, or other web-based connectable equipment.

System 100 also includes point-of-sale (POS) terminals 118, which may be connected to client systems 114 and may be connected to server system 112. POS terminals 118 are interconnected to the Internet through many interfaces including a network, such as a local area network (LAN) or a wide area network (WAN), dial-in-connections, cable modems, wireless modems, and special high-speed ISDN lines. POS terminals 118 could be any device capable of interconnecting to the Internet and including an input device capable of reading information from a consumer's financial transaction card.

A database server 116 is connected to database 120, which contains information on a variety of matters, as described below in greater detail. In one embodiment, centralized database 120 is stored on server system 112 and can be accessed by potential users at one of client systems 114 by logging onto server system 112 through one of client systems 114. In an alternative embodiment, database 120 is stored remotely from server system 112 and may be non-centralized.

Database 120 may include a single database having separated sections or partitions or may include multiple databases, each being separate from each other. Database 120 may store transaction data generated as part of sales activities conducted over the processing network including data relating to merchants, account holders or customers, issuers, acquirers, purchases made. Database 120 may also store account data including at least one of a name of cardholder 22, an address of cardholder 22, a primary account number (PAN) associated with the name of cardholder 22, and other account identifiers. Database 120 may also store merchant data including a merchant identifier that identifies each merchant 24 registered to use payment card network 28, and instructions for settling transactions including merchant bank account information. Database 120 may also store purchase data associated with items being purchased by cardholder 22 from merchant 24, and authorization request data. Database 120 may store picture files associated with the item for sale by the seller, name, price, description, shipping and delivery information, instructions for facilitating the transaction, and other information to facilitate processing according to the method described in the present disclosure.

In the example embodiment, one of client systems 114 may be associated with acquirer bank 26 (shown in FIG. 1) while another one of client systems 114 may be associated with issuer bank 30 (shown in FIG. 1). POS terminal 118 may be associated with a participating merchant 24 (shown in FIG. 1) or may be a computer system and/or mobile system used by cardholder 22 when making an on-line purchase or payment. Server system 112 may be associated with payment card network 28. In the example embodiment, server system 112 is associated with a financial transaction processing network, such as payment card network 28, and may be referred to as an interchange computer system. Server system 112 may be used for processing transaction data. In addition, client systems 114 and/or POS 118 may include a computer system associated with at least one of an online bank, a bill payment outsourcer, an acquirer bank, an acquirer processor, an issuer bank associated with a transaction card, an issuer processor, a remote payment processing system, a biller, payment platform 34, and/or transaction module 38. Payment platform 34, and/or transaction module 38 may be associated with payment card network 28 or with an outside third party in a contractual relationship with payment card network 28. Accordingly, each party involved in processing transaction data are associated with a computer system shown in system 100 such that the parties can communicate with one another as described herein.

Using payment card network 28, the computers of the merchant bank or the merchant processor communicate with the computers of the issuer bank to determine whether the consumer's account is in good standing and whether the purchase is covered by the consumer's available credit line. Based on these determinations, the request for authorization will be declined or accepted. If the request is accepted, an authorization code is issued to the merchant.

When a request for authorization is accepted, the available credit line of consumer's account is decreased. Normally, a charge is not posted immediately to a consumer's account because bankcard associations, such as MasterCard International Incorporated®, have promulgated rules that do not allow a merchant to charge, or "capture," a transaction until goods are shipped or services are delivered. When a merchant ships or delivers the goods or services, the merchant captures the transaction by, for example, appropriate data entry procedures on the point-of-sale terminal. If a consumer cancels a transaction before it is captured, a "void" is generated. If a consumer returns goods after the transaction has been captured, a "credit" is generated.

For debit card transactions, when a request for a PIN authorization is approved by the issuer, the consumer's account is decreased. Normally, a charge is posted immediately to a consumer's account. The bankcard association then transmits the approval to the acquiring processor for distribution of goods/services, or information or cash in the case of an ATM.

After a transaction is captured, the transaction is settled between the merchant, the merchant bank, and the issuer. Settlement refers to the transfer of financial data or funds between the merchant's account, the merchant bank, and the issuer related to the transaction. Usually, transactions are captured and accumulated into a "batch," which is settled as a group.

The financial transaction cards or payment cards discussed herein may include credit cards, debit cards, a charge card, a membership card, a promotional card, prepaid cards, and gift cards. These cards can all be used as a method of payment for performing a transaction. As described herein, the term "financial transaction card" or "payment card" includes cards such as credit cards, debit cards, and prepaid cards, but also includes any other devices that may hold payment account information, such as mobile phones, personal digital assistants (PDAs), key fobs, or other devices, etc.

Figure 3:
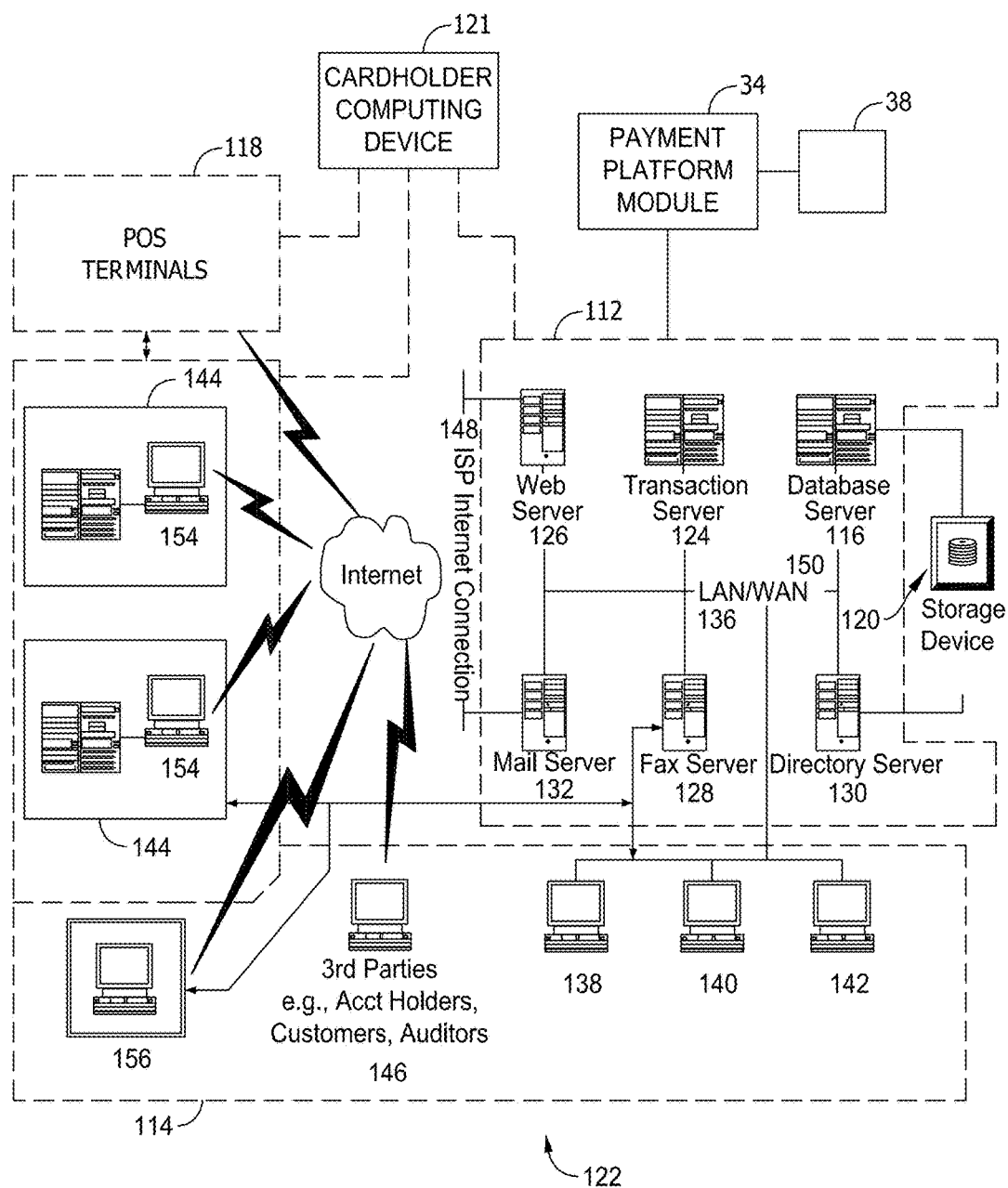

FIG. 3 is an expanded block diagram of an example embodiment of a server architecture of a processing system 122 including other computer devices in accordance with one embodiment of the present disclosure. Components in system 122, identical to components of system 100 (shown in FIG. 2), are identified in FIG. 3 using the same reference numerals as used in FIG. 2. System 122 includes server system 112, client systems 114, and POS terminals 118. Server system 112 further includes database server 116, a transaction server 124, a web server 126, a fax server 128, a directory server 130, and a mail server 132. A storage device 134 is coupled to database server 116 and directory server 130. Servers 116, 124, 126, 128, 130, and 132 are coupled in a local area network (LAN) 136. In addition, a system administrator's workstation 138, a user workstation 140, and a supervisor's workstation 142 are coupled to LAN 136. Alternatively, workstations 138, 140, and 142 are coupled to LAN 136 using an Internet link or are connected through an Intranet. Processing system 122 also includes payment platform 34, and/or transaction module 38.

Each workstation, 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and to third parties, e.g., account holders, customers, auditors, developers, consumers, merchants, acquirers, issuers, etc., 146 using an ISP Internet connection 148. The communication in the example embodiment is illustrated as being performed using the Internet, however, any other wide area network (WAN) type communication can be utilized in other embodiments, i.e., the systems and processes are not limited to being practiced using the Internet. In addition, and rather than WAN 150, local area network 136 could be used in place of WAN 150.

In the example embodiment, any authorized individual having a workstation 154 can access system 122. At least one of the client systems includes a manager workstation 156 located at a remote location. Workstations 154 and 156 are personal computers having a web browser. Also, workstations 154 and 156 are configured to communicate with server system 112. Furthermore, fax server 128 communicates with remotely located client systems, including a client system 156 using a telephone link. Fax server 128 is configured to communicate with other client systems 138, 140, and 142 as well.

Figure 4:
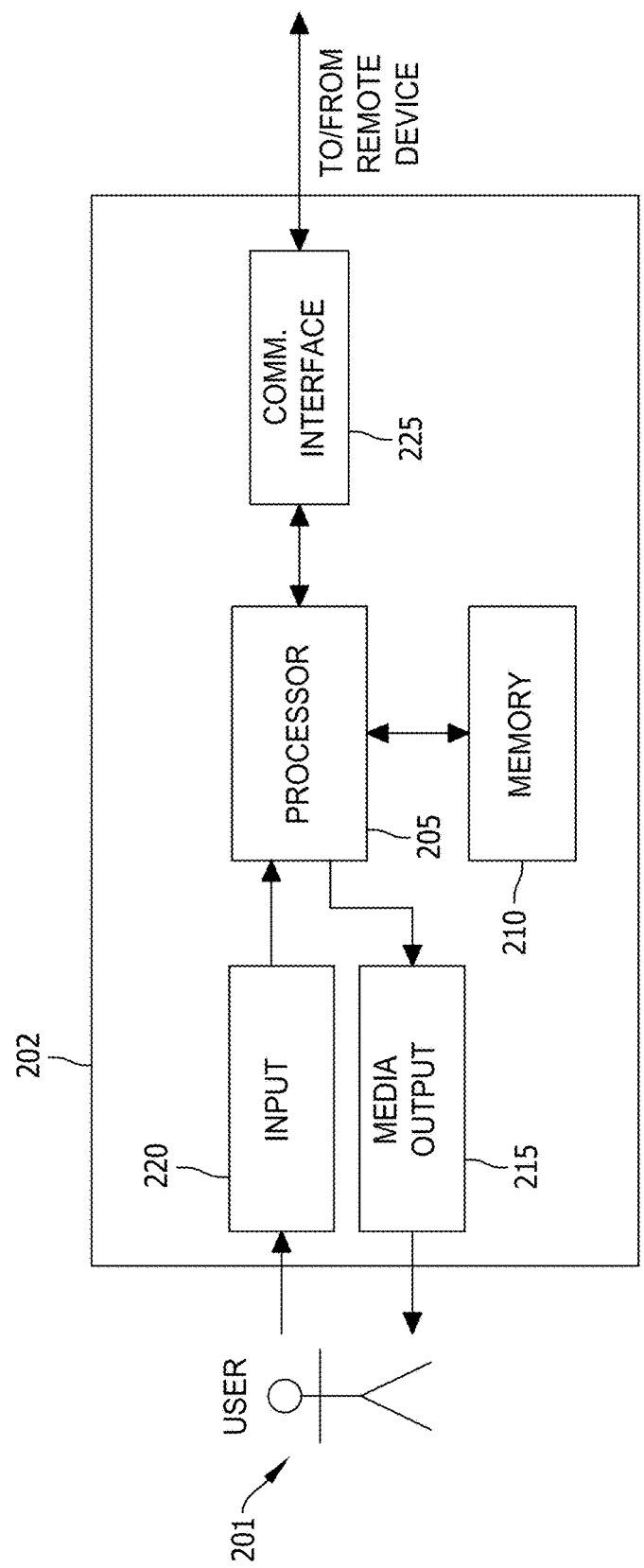

FIG. 4 illustrates an example configuration of a user system 202 operated by a user 201, such as cardholder 22 (shown in FIG. 1). User system 202 may include, but is not limited to, client systems 114, 138, 140, and 142, POS terminal 118, workstation 154, and manager workstation 156. In the example embodiment, user system 202 includes a processor 205 for executing instructions. In some embodiments, executable instructions are stored in memory device 210. Processor 205 may include one or more processing units, for example, a multi-core configuration. Memory device 210 is any device allowing information such as executable instructions and/or written works to be stored and retrieved. Memory device 210 may include one or more computer readable media.

User system 202 also includes at least one media output component 215 for presenting information to user 201. Media output component 215 is any component capable of conveying information to user 201. In some embodiments, media output component 215 includes an output adapter such as a video adapter and/or an audio adapter. An output adapter is operatively coupled to processor 205 and operatively couplable to an output device such as a display device, a liquid crystal display (LCD), organic light emitting diode (OLED) display, or "electronic ink" display, or an audio output device, a speaker or headphones.

In some embodiments, user system 202 includes an input device 220 for receiving input from user 201. Input device 220 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 215 and input device 220. User system 202 may also include a communication interface 225, which is communicatively couplable to a remote device such as server system 112. Communication interface 225 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Stored in memory device 210 are, for example, computer readable instructions for providing a user interface to user 201 via media output component 215 and, optionally, receiving and processing input from input device 220. A user interface may include, among other possibilities, a web browser and client application. Web browsers enable users, such as user 201, to display and interact with media and other information typically embedded on a web page or a website from server system 112. A client application allows user 201 to interact with a server application from server system 112.

Figure 5:
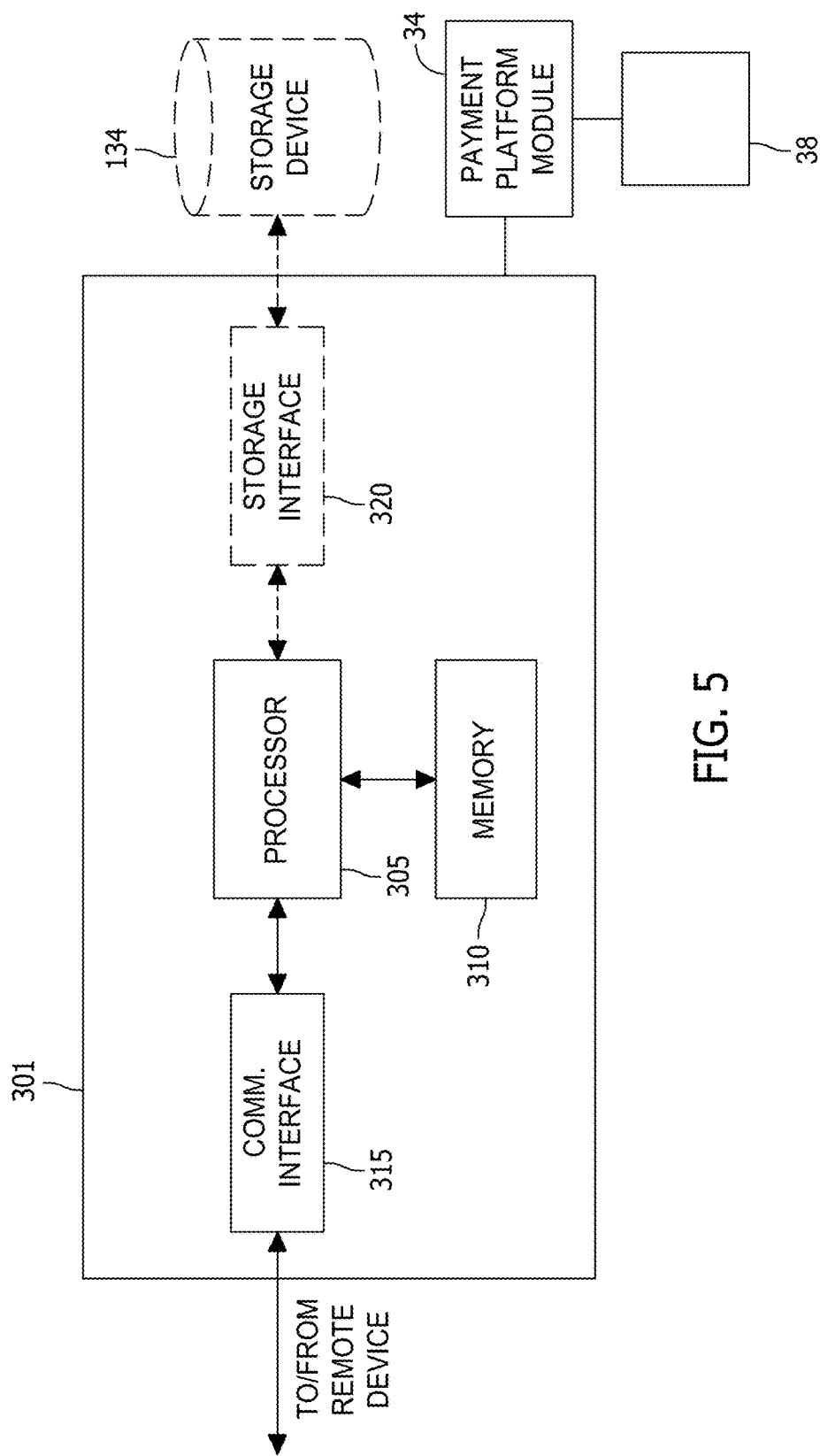

FIG. 5 illustrates an example configuration of a server system 301 such as server system 112 (shown in FIGS. 2 and 3). Server system 301 may include, but is not limited to, database server 116, transaction server 124, web server 126, fax server 128, directory server 130, and mail server 132.

Server system 301 includes a processor 305 for executing instructions. Instructions may be stored in a memory device 310, for example. Processor 305 may include one or more processing units (e.g., in a multi-core configuration) for executing instructions. The instructions may be executed within a variety of different operating systems on the server system 301, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Server system 301 may be communicatively coupled to payment platform 34, and/or transaction module 38. Payment platform 34 in communication with server system 112 is configured to receive item information, and store the item information in memory device 310 with item information for other items, if any. Payment platform 34 is also configured to transmit the item information to selectable personal communication network outlets associated with the seller. Payment platform 34 is further configured to enable selling of products and services over personal communication network outlets. In the example embodiment, payment platform 34 may be external to server system 301 and may be accessed by multiple server systems 301. For example, payment platform 34 may be embodied in a computing device coupled to a memory device 310. In some embodiments, payment platform 34 may be integrated with server system 301. For example, payment platform 34 may be a specifically programmed section of server system 301 configured to perform the functions described herein when executed by processor 305.

Processor 305 is operatively coupled to a communication interface 315 such that server system 301 is capable of communicating with a remote device such as a user system or another server system 301. For example, communication interface 315 may receive requests from user system 114 via the Internet, as illustrated in FIGS. 2 and 3.

Processor 305 may also be operatively coupled to a storage device 134. Storage device 134 is any computer-operated hardware suitable for storing and/or retrieving data. In some embodiments, storage device 134 is integrated in server system 301. For example, server system 301 may include one or more hard disk drives as storage device 134. In other embodiments, storage device 134 is external to server system 301 and may be accessed by a plurality of server systems 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory device 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are examples only, and are thus not limiting as to the types of memory usable for storage of a computer program.

Figure 6:
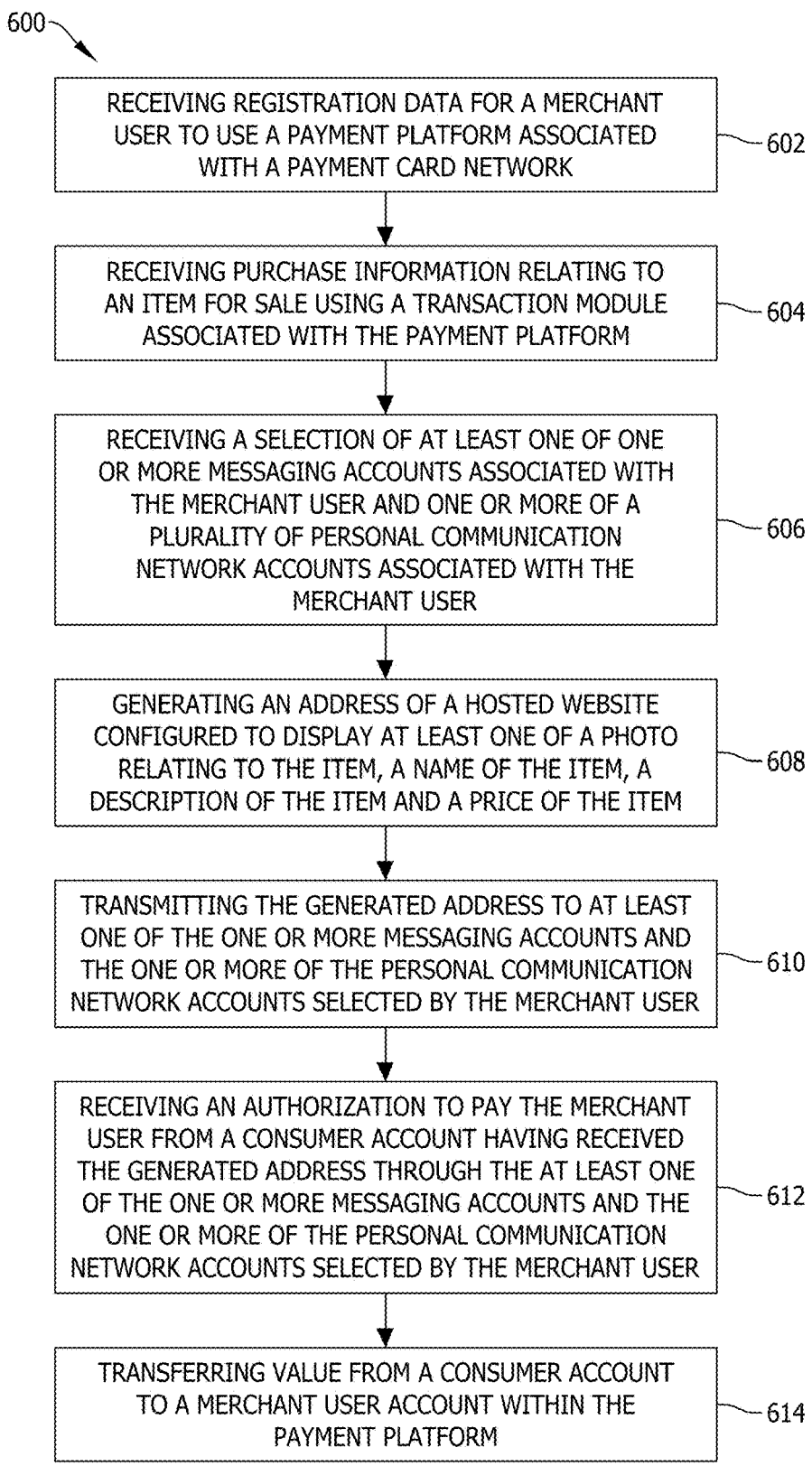

FIG. 6 illustrates computer-based method 600 for processing purchase transactions using a personal communication network. Method 600 is implemented using one or more computer devices coupled to memory device 210, 310. Examples of computer devices include, but are not limited to server system 112, client systems 114, payment platform 34, transaction module 38, and cardholder computing device 121.

In the example embodiment, method 600 includes receiving 602 registration data for a seller to use a payment platform associated with a payment card network and receiving 604 item information relating to an item for sale using transaction module 38 associated with payment platform 34. In various embodiments, a seller downloads a computer application, for example, but not limited to, an app. As used herein, refers to a self-contained program or piece of software designed to fulfill a particular purpose and downloaded by a user to a mobile device. The app is configured to interface with payment platform 34 using transaction module 38. Registering can occur within the app or within a website associated with payment platform 34. Registering permits the seller to receive live payments through payment platform 34. A menu in the app displays statistics relating to the seller account and the sales made by the seller. The menu also includes sales and management tools to facilitate record-keeping, sales tax obligations, and marketing. The registration data includes contact information for the seller and an account number for payment platform 34 account associated with the seller. The item information includes at least one of a name of the item, a description of the item, a price of the item, shipping and/or pickup information, and a photo of the item or that relates to the item.

Method 600 further includes receiving 606 a selection of at least one of (1) one or more messaging accounts associated with the seller and (2) one or more of a plurality of personal communication network accounts associated with the seller and generating 608 an address of a hosted website configured to display at least one of a photo relating to the item, a name of the item, a description of the item and a price of the item. The at least one of one or more messaging accounts can include, for example, but not limited to SMS, email, Twitter®, and the like. The one or more of a plurality of personal communication network accounts include social media outlets, such as, but not limited to Facebook®, Instagram®, Pinterest®, Google+™, and the like.

Method 600 also includes transmitting 610 the generated URL address to at least one of the one or more messaging accounts and the one or more of the personal communication network accounts selected by the seller, and receiving 612 an authorization to pay the seller from a consumer account having received the generated address through the at least one of the one or more messaging accounts and the one or more of the personal communication network accounts selected by the seller.

Method 600 further includes transferring 614 value from a consumer account to a seller account within payment platform 34. In the example embodiment, transferring value may include transferring money from one account associated with the purchaser to another account associated with the seller, or applying a credit to one account and a debit to another account.

Optionally, method 600 also includes receiving item information for an item for sale that includes a description of the item and a price of the item. In various embodiments, method 600 also includes receiving a photo relating to the item. Method 600 may also include transmitting the generated address directly to the seller for forwarding the generated address to the one or more messaging accounts and the one or more of the personal communication network accounts by the seller. In other embodiments, the consumer may also register for use of payment platform 34. In this way, the consumer pays the seller by a simple transfer of value between accounts in payment platform 34. In still other embodiments, the consumer remits funds to payment platform 34, which funds are then credited to the seller account. For example, the consumer may pay by mailing a check or money order, paying by PayPal® or other money transfer service.

Figure 7:
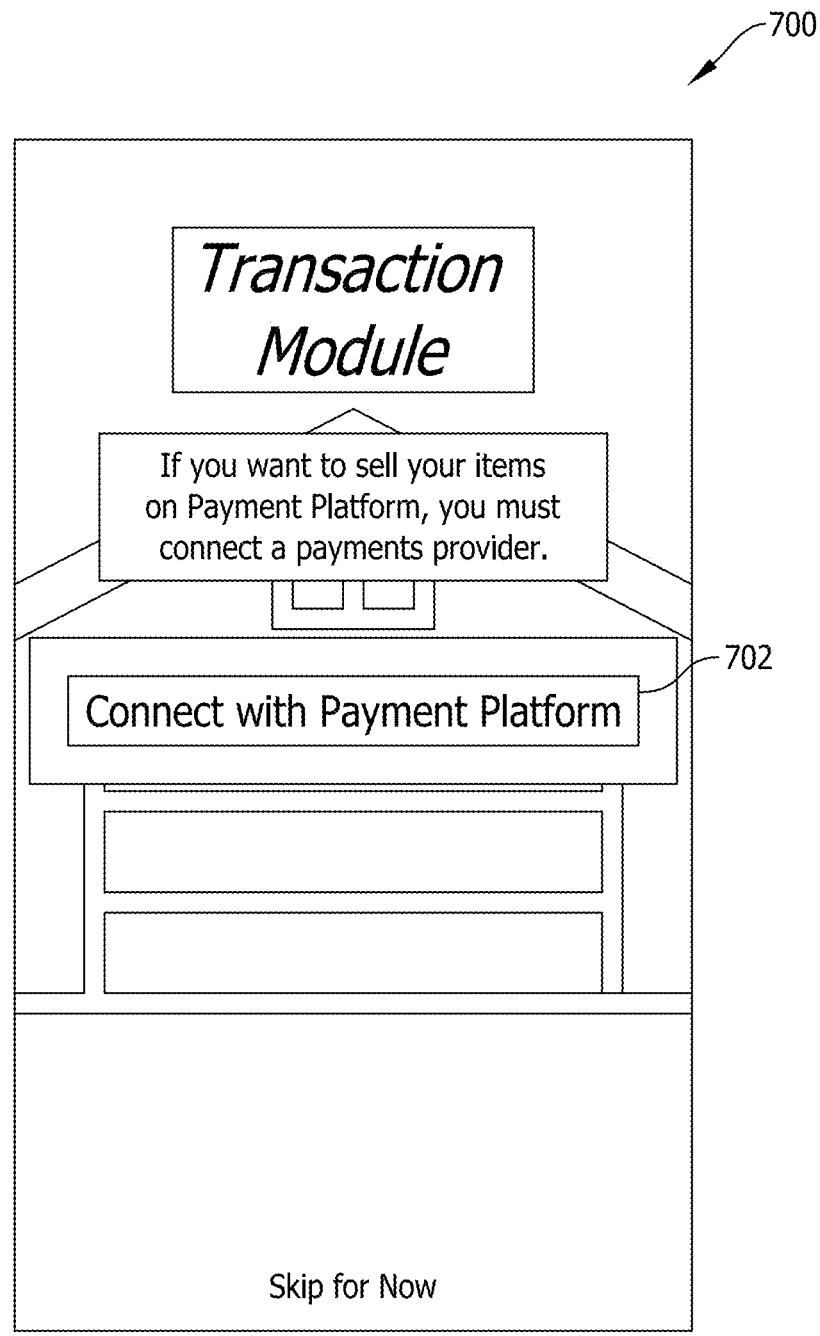

FIG. 7 is a screen capture of a splash page 700 for transaction module 38 used for selling items by a seller through messaging accounts and personal communication networks associated with the seller. Splash page 700 includes options for connecting 702 to a payment provider or skipping 704 the connection process for a later time.

Figure 8:
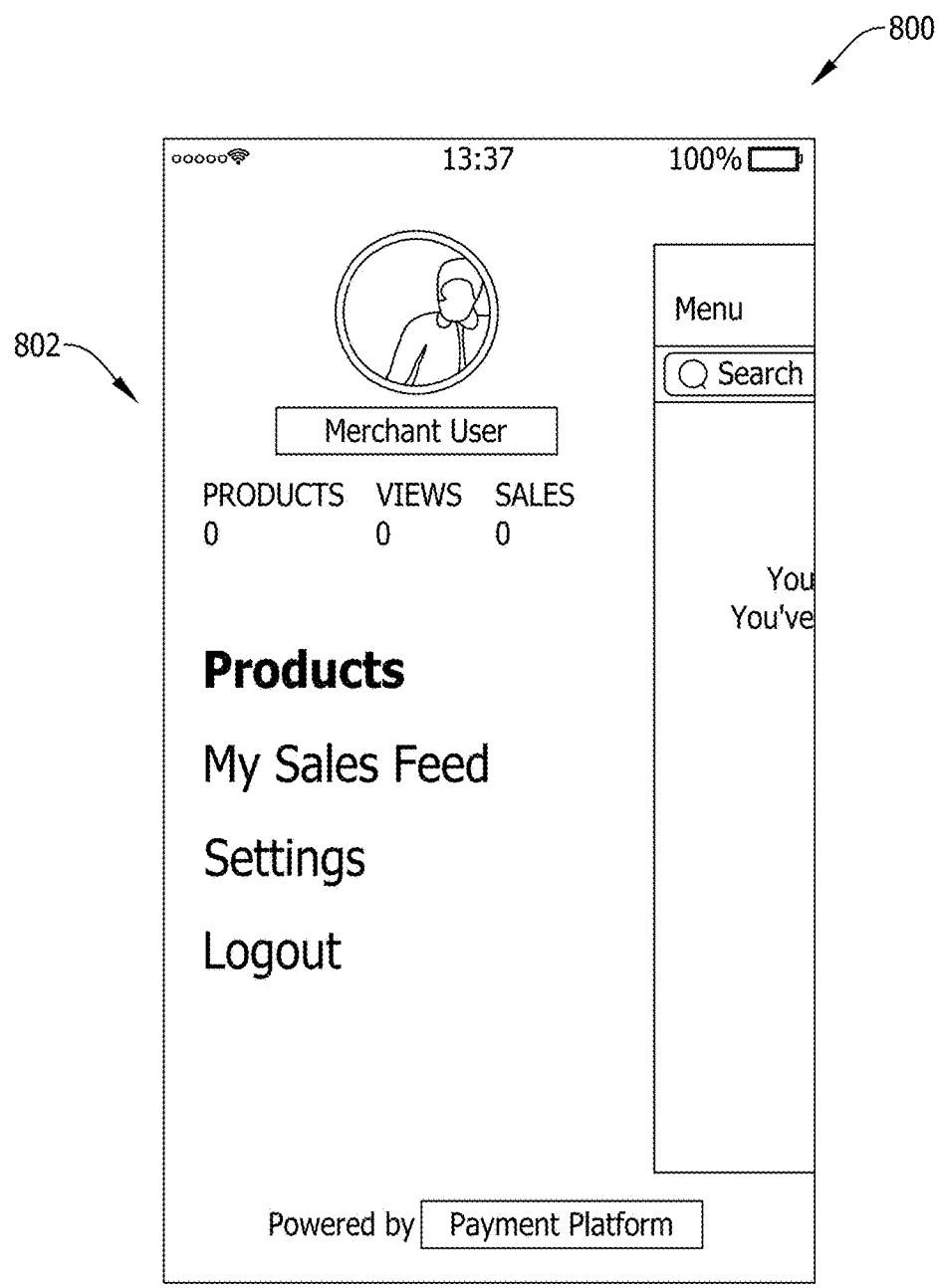

FIG. 8 is a screen capture of a menu page 800 for transaction module 38. A menu 802 provides access to statistics relating to the seller account and sales and marketing tools.

Figure 9:
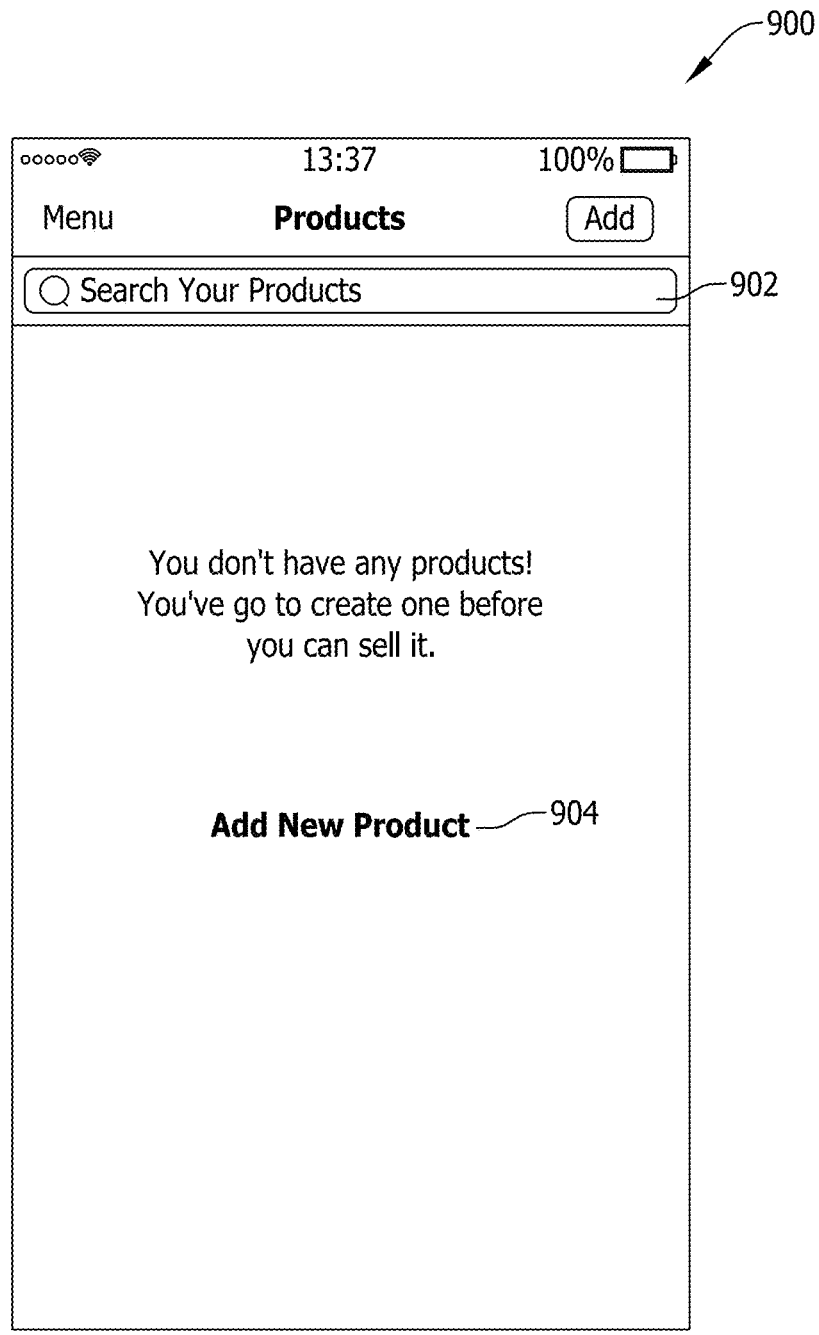

FIG. 9 is a screen capture of an "add new product" page 900 for transaction module 38. "Add new product" page 900 provides the seller an option to search 902 for their own product listing(s) or to access 904 a data entry page for entering data relating to a new item for sale.

Figure 10:
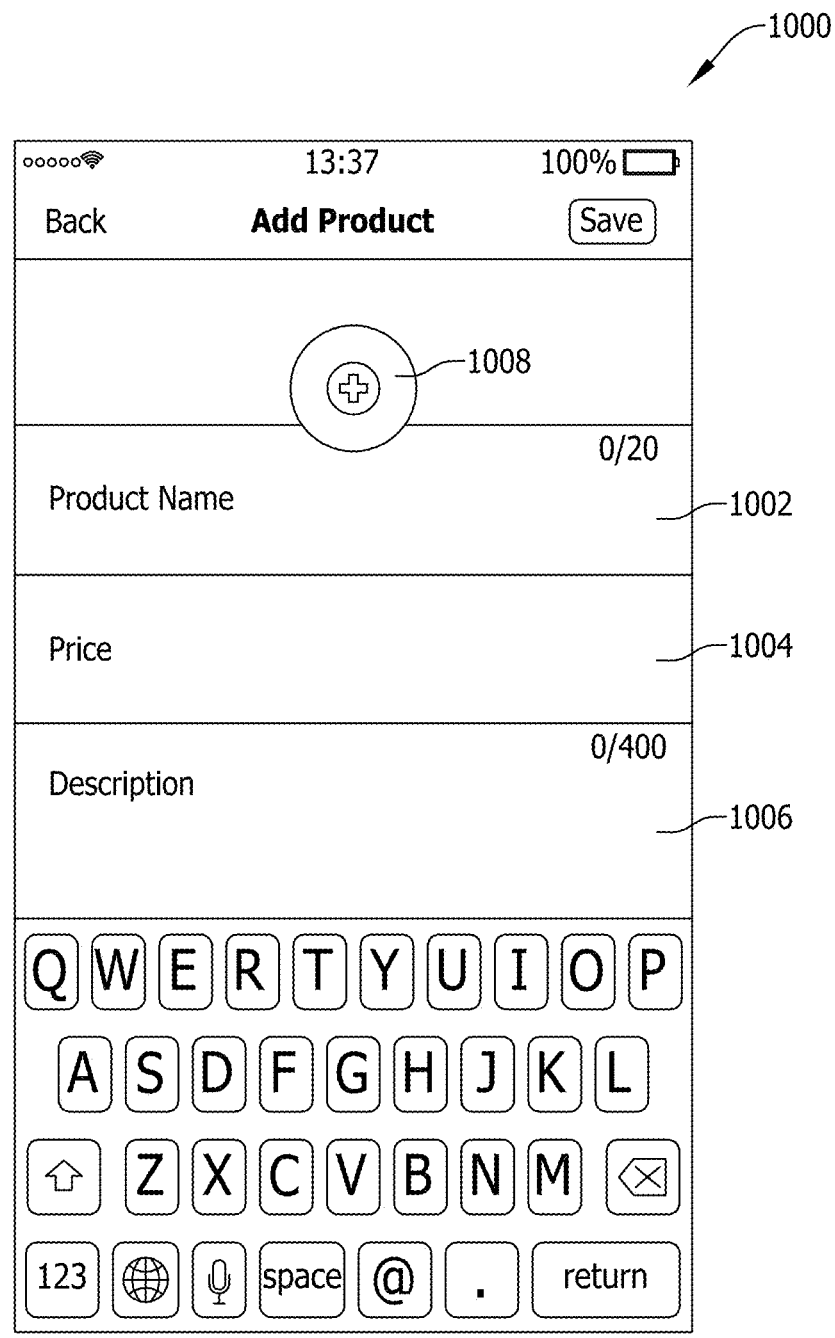

FIG. 10 is a screen capture of a new product entry page 1000 for transaction module 38. New product entry page 1000 includes a product name field 1002, a price field 1004, a description field 1006, and a camera key 1008 configured to permit taking or importing a photo of the product being offered for sale by the seller.

Figure 11:
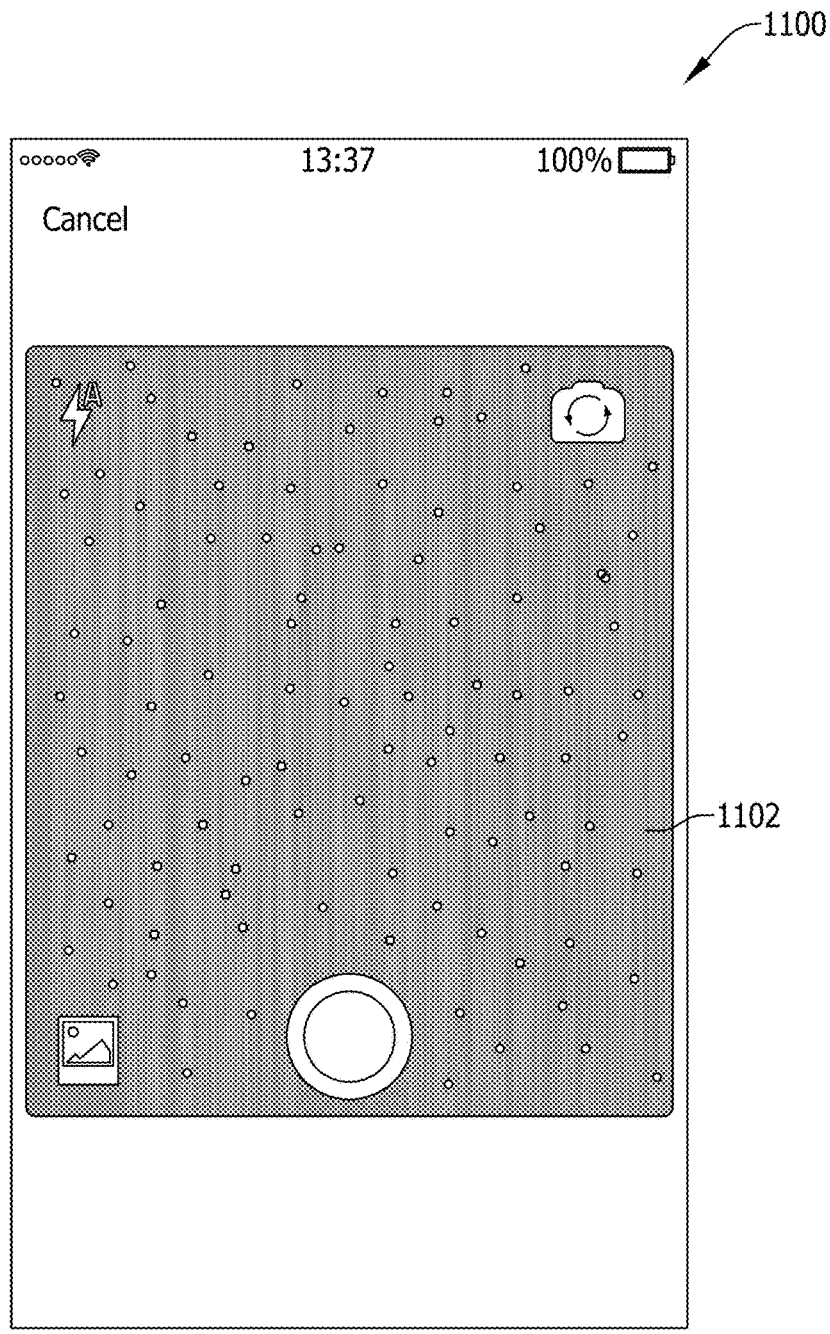

FIG. 11 is a screen capture of a camera view 1100 for transaction module 38. Pressing camera key 1008 (shown in FIG. 10) accessing the computer device camera such that camera view 1100 is displayed on a screen 1102. The seller can then photograph the product and upon accepting the photo, the photo is displayed on new product entry page 1000 (shown in FIG. 10).

Figure 12:
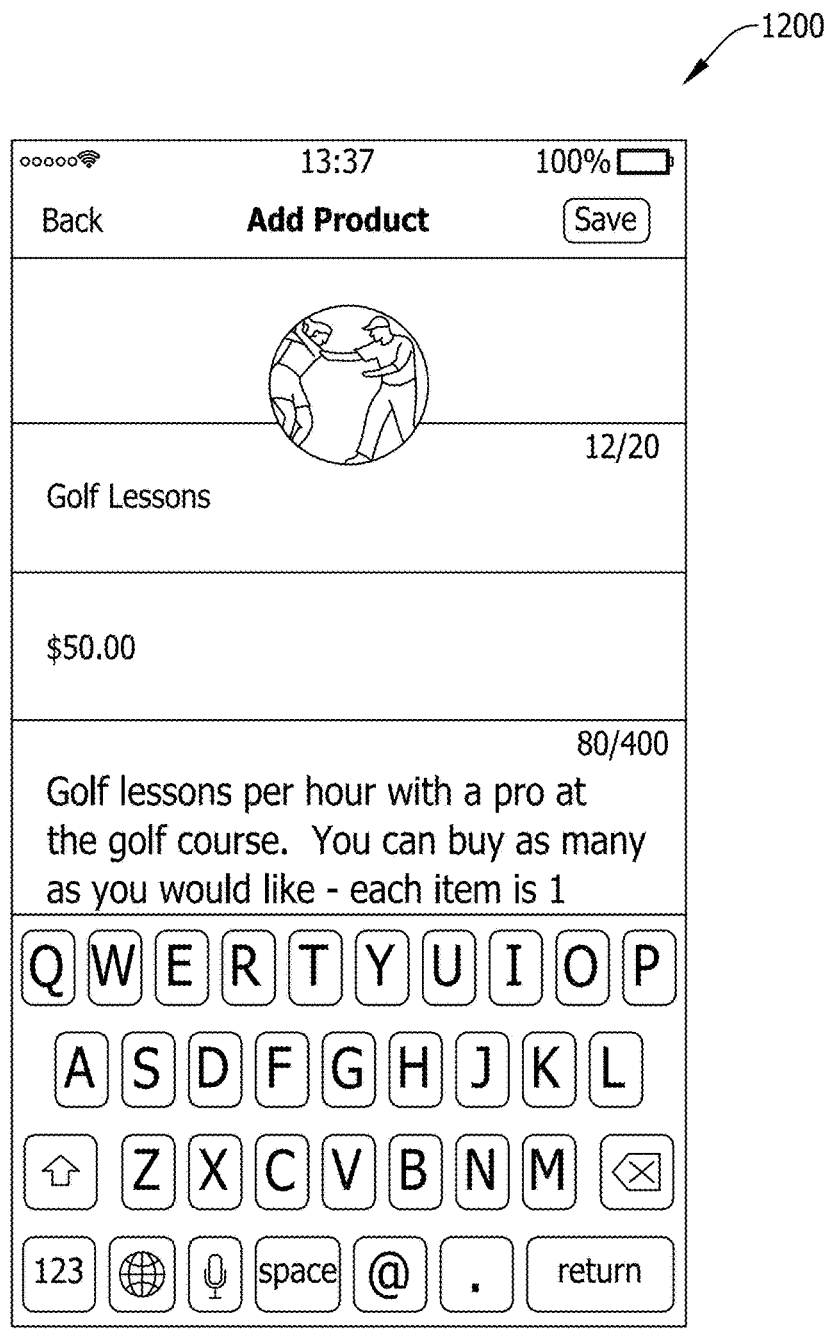

FIG. 12 is a screen capture of a completed page 1200 for adding a new product for sale using transaction module 38. In addition, other fields may be included on new product entry page 1000 (shown in FIG. 10), which would also be shown on completed page 1200. For example, a shipping or pick-up field, an "include tax" field, a "private sale" field, and an "include product in mobile app" field could be included, which would provide more options for the seller and more restrictions on the dissemination of the sale listing. The above fields are not shown in FIG. 12. For example, the private sale field could be used to restrict the dissemination to a particular person or group and could restrict the forwarding of the listing to others not in the group.

Figure 13:
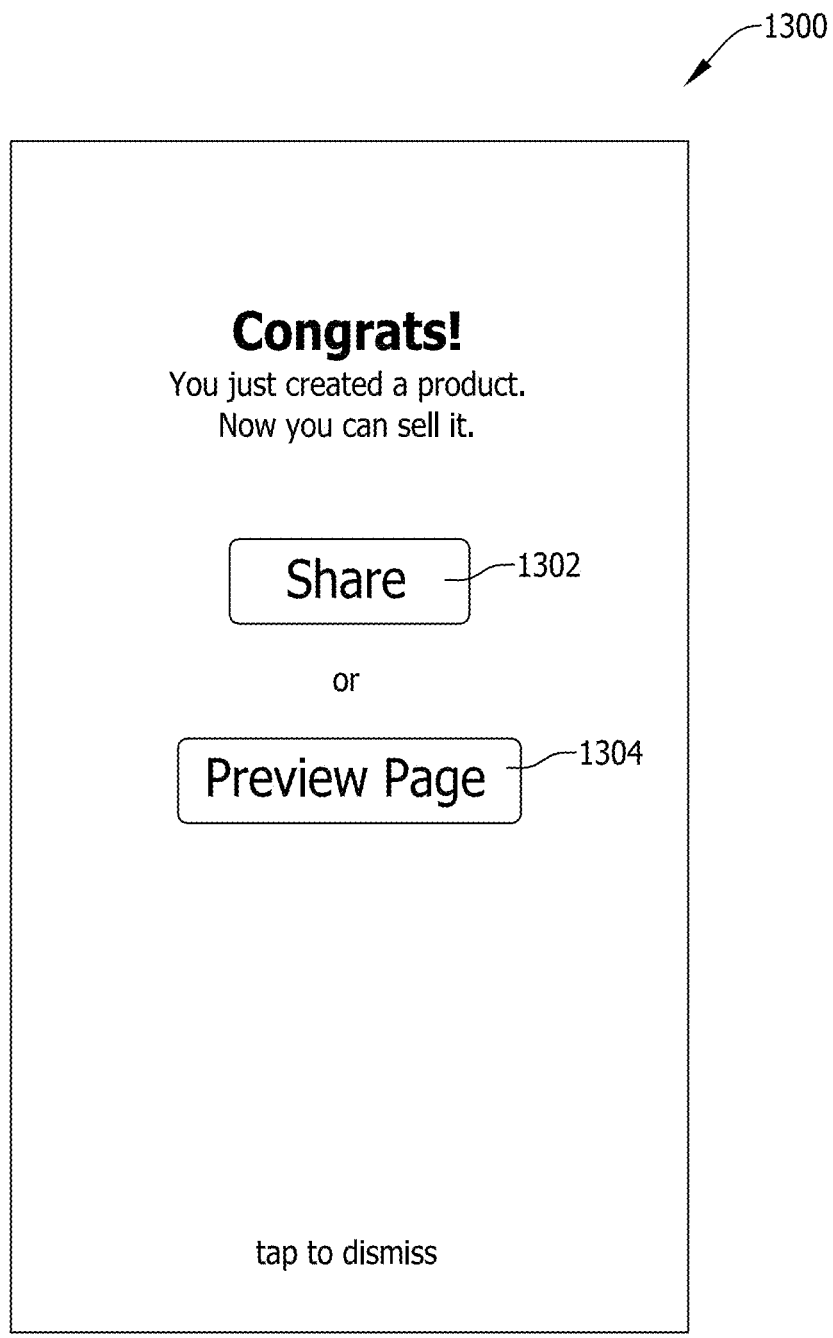

FIG. 13 is a screen capture of a share listing page 1300 for transaction module 38. Share listing page 1300 includes a share button 1302 and a preview button 1304. Share button 1302 opens to a share selection page 1400 (shown in FIG. 14) and preview button 1304 opens to a listing preview page (not shown in FIG. 13).

Figure 14:
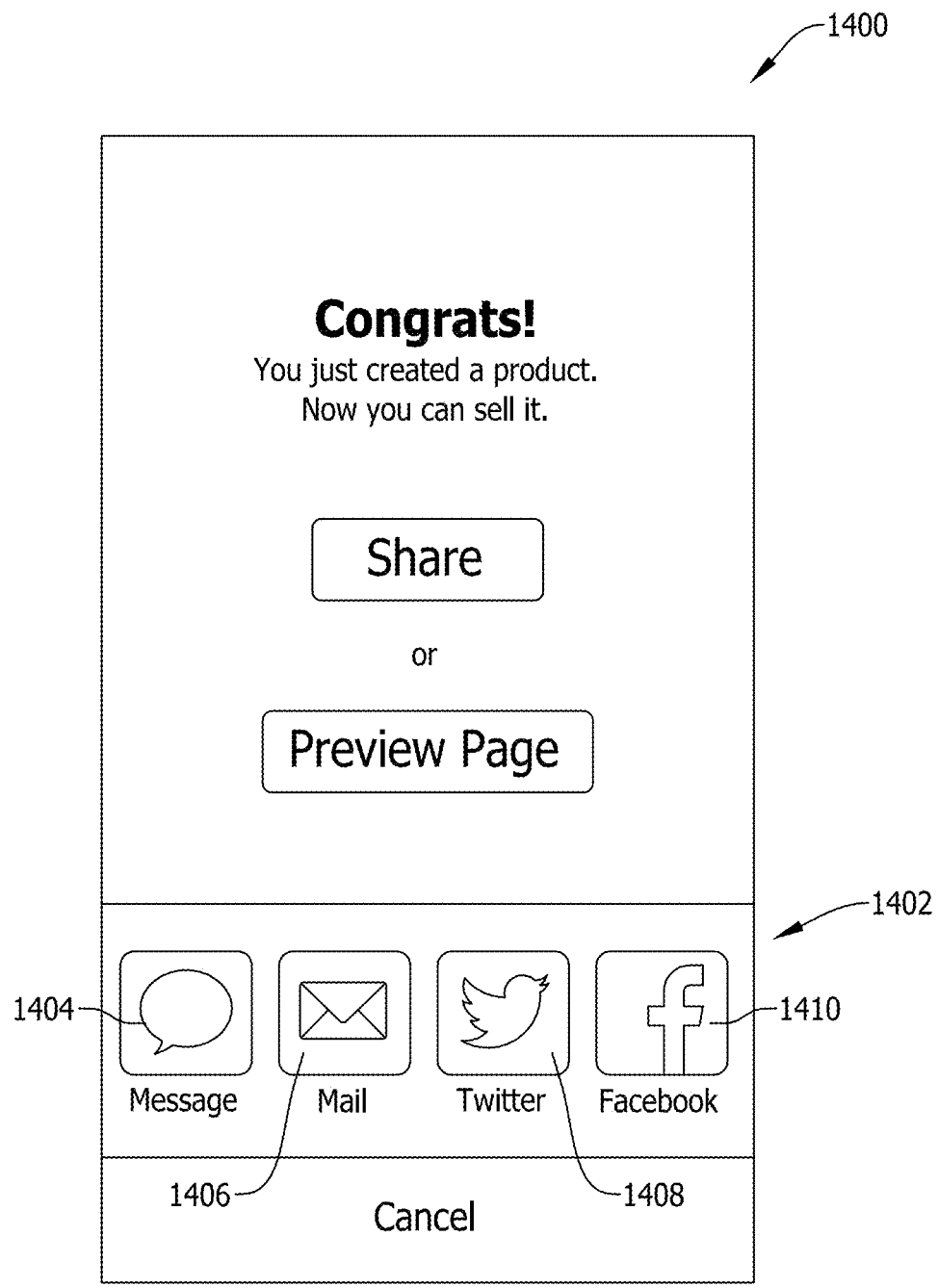

FIG. 14 is a screen capture of share selection page 1400 for transaction module 38. Share selection page 1400 includes one or more buttons 1402 for the seller to select which, if any, of their personal messaging or personal communication network outlets they want to post the listing. In the example embodiment, an SMS outlet 1404, an email outlet 1406, a Twitter® outlet 1408, and a Facebook® outlet 1410 are shown for selection.

Figure 15:
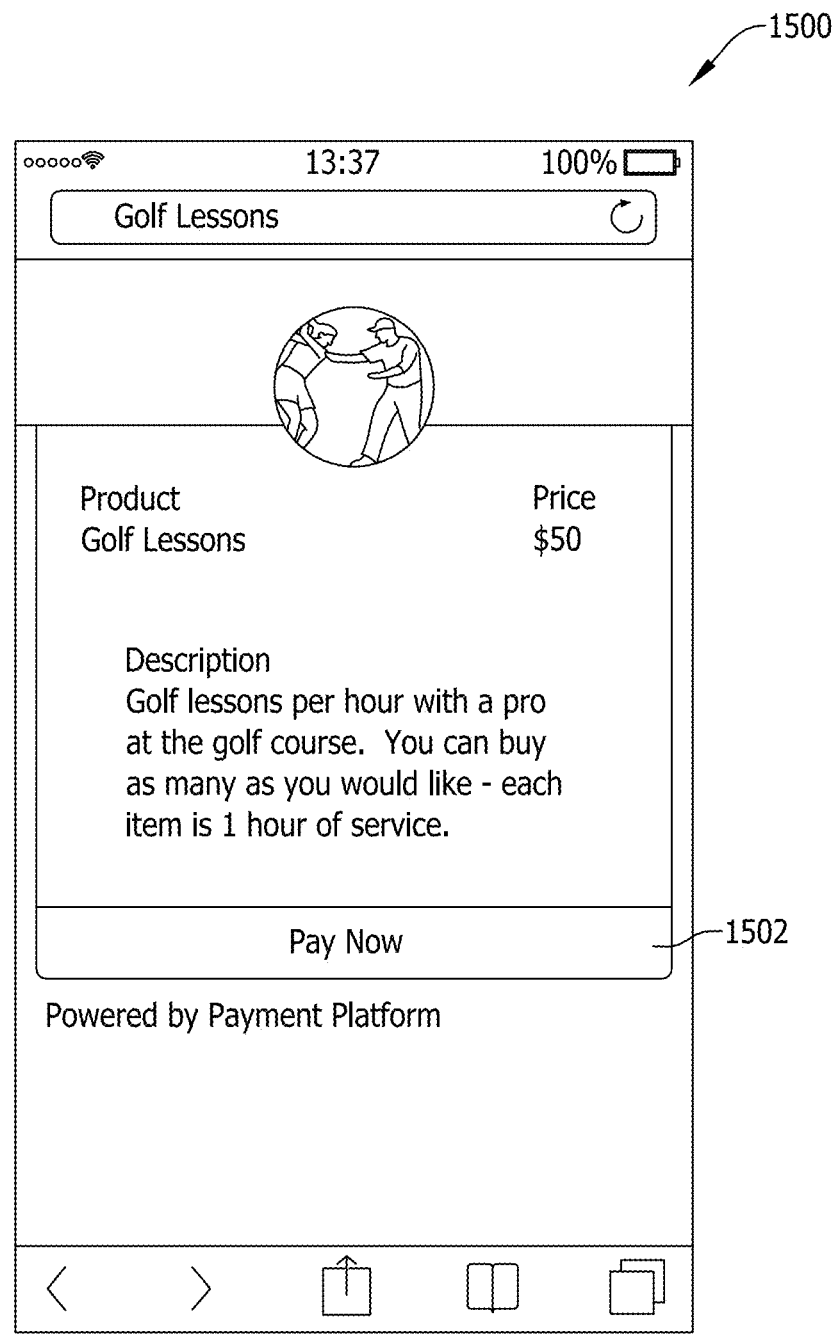

FIG. 15 is a screen capture of listing display page 1500 for transaction module 38. A consumer, such as, but not limited to, a "friend", "connection", "follower", etc. of the seller receives a URL for the listing through the respective personal messaging or personal communication network outlets associated with those selected by the seller. Upon clicking on the URL link, the consumer is directed to listing display page 1500 hosted on at least one of transaction module 38, payment platform 34, payment card network 28, or other server accessible by the link, including third party servers. Listing display page 1500 includes a button 1502 to "Pay Now" that initiates a transfer of value from the consumer's payment platform account to the seller's payment platform account.

Figure 16:
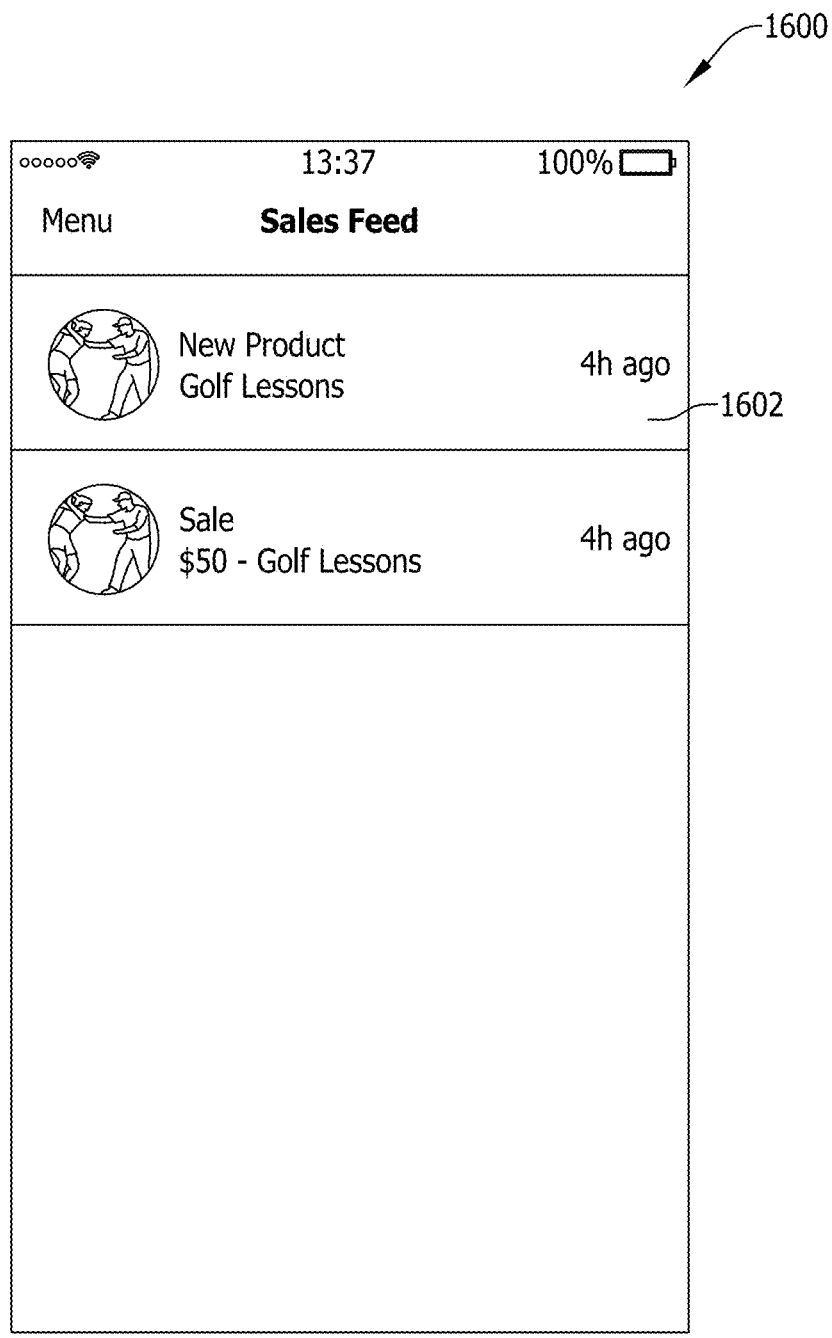

FIG. 16 is a screen capture of a sales feed page 1600 for transaction module 38. In the example embodiment, sales feed page 1600 includes a sales tracking display 1602.

Figure 17:
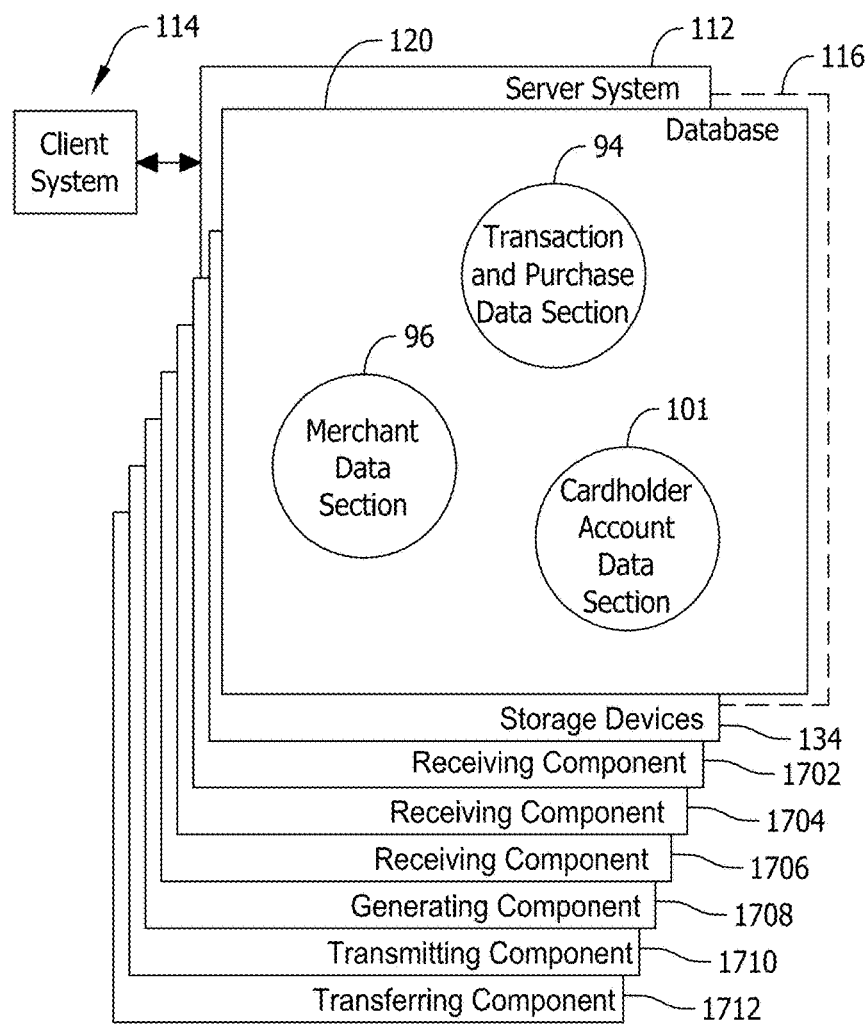

FIG. 17 shows a configuration of database 120 within database server 116 of server system 112 with other related server components. More specifically, FIG. 17 shows a configuration of database 120 in communication with database server 116 of server system 112 shown in FIGS. 2 and 3. Database 120 is coupled to several separate components within server system 112, which perform specific tasks.

Server system 112 includes a first receiving component 1702 for receiving registration data for a seller to use payment platform 34 (shown in FIGS. 1-3) associated with payment card network 28 and a second receiving component 1704 for receiving item information using transaction module 38 (shown in FIGS. 1-3) associated with payment platform 34. Server system 112 includes a third receiving component 1706 for receiving a selection of at least one of one or more messaging accounts associated with the seller and one or more of a plurality of personal communication network accounts associated with the seller and a generating component 1708 for generating an address of a hosted website configured to display at least one of a photo relating to the item, a name of the item, a description of the item and a price of the item. Server system 112 includes a transmitting component 1710 for transmitting the generated address to at least one of the one or more messaging accounts and the one or more of the personal communication network accounts selected by the seller and a receiving component xx for receiving an authorization to pay the seller from a consumer account having received the generated address through the at least one of the one or more messaging accounts and the one or more of the personal communication network accounts selected by the seller. Server system 112 includes a transferring component 1712 for transferring value from a consumer account to a seller account within payment platform 34 (shown in FIGS. 1-3). System 100 is flexible to provide other alternative types of reports and is not constrained to the options set forth above.

In an exemplary embodiment, database 120 is divided into a plurality of sections, including but not limited to, a Transaction and Purchase Data Section 94, a Merchant Data Section 96, and a Cardholder Account Data Section 101. These sections within database 120 are interconnected to update and retrieve the information as required.

Figure 18:
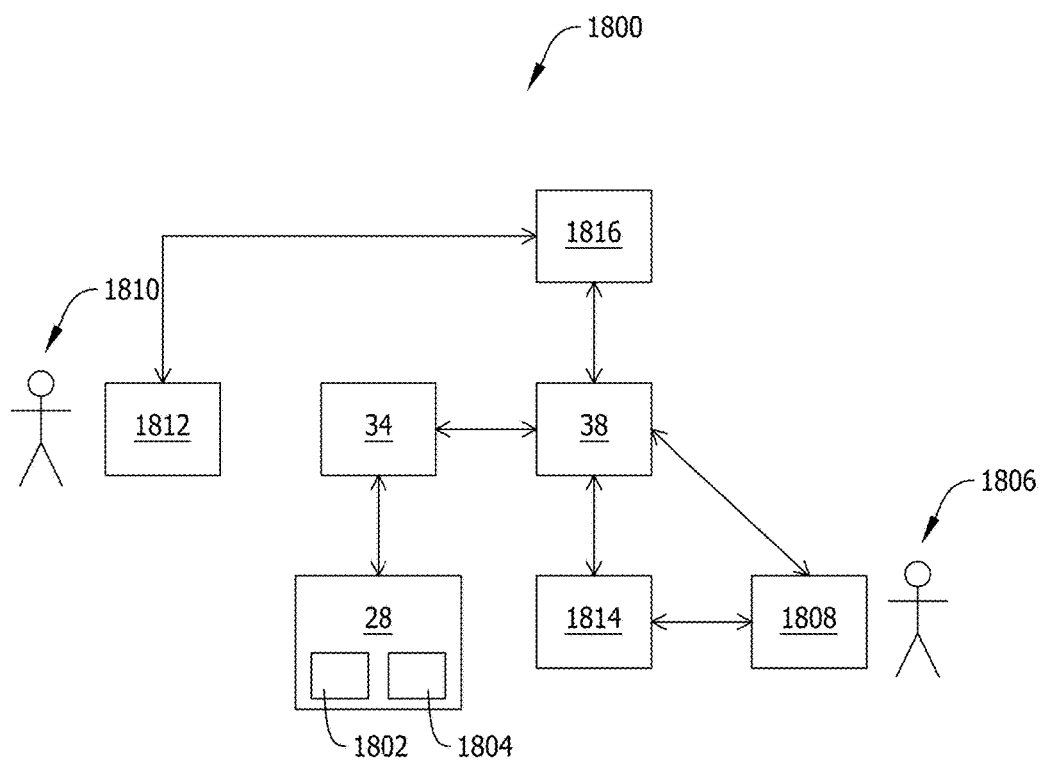

FIG. 18 is a schematic block diagram of personal media sales system 1800 in accordance with an example embodiment of the present disclosure. Personal media sales system 1800 is similar to personal media sales system 10 (shown in FIG. 1). Like components shown in FIGS. 1 and 18 are labeled with like reference numerals. In the example embodiment, personal media sales system 1800 includes payment card network 28, which includes one or more processors 1802 communicatively coupled to one or more memory devices 1804. Payment platform 34 is configured to process a transaction between a seller 1806 using a seller computing device 1808 and a consumer 1810 using a consumer computing device 1812 in a transaction that uses other than a payment card associated with payment card network 28 to complete the transaction. For example, in the exemplary embodiment, the transaction is completed using transaction module 34 (also shown in FIG. 1) in conjunction with payment card network 20. Transaction module 38 is configured to operate in conjunction with payment platform 34 to receive item information and transmit the received item information to one or more personal communication network outlets 1814 selected and controlled by seller 1806 associated with seller computing device 1808. In some embodiments, the item information includes an image representing the product or service for sale. Transaction module 38 is further configured to receive seller information relating to a seller identity and initiate a seller account based on the received seller identity. Seller computing device 1808 is communicatively couplable to payment card network 28 directly and transaction module 38 is configured to transmit the received information to seller computing device 1808. Transaction module 38 is configured to generate a sales web page 1816 that is associated with a public network address, such as, but not limited to, a URL. Sales web page 1816 includes the received item information. Transaction module 38 is configured to transmit the received item information to one or more personal communication network outlets 1814 selected and controlled by seller 1806. The personal communication network outlets 1814 may include email accounts, social media accounts, and other communication system accounts.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by mobile devices, clusters, personal computers, workstations, clients, servers, and processor 205, 305 wherein the memory includes RAM memory, ROM memory, EPROM memory, EEPROM memory, and non-volatile RAM (NVRAM) memory. The above memory types are examples only, and are thus not limiting as to the types of memory usable for storage of a computer program.

As will be appreciated based on the foregoing specification, the above-discussed embodiments of the disclosure may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture, according to the discussed embodiments of the disclosure. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network. The technical effect of the methods and systems may be achieved by performing at least one of the following steps: (a) receiving registration data for a seller to use a payment platform associated with a payment card network, (b) receiving item information relating to an item for sale using a transaction module associated with the payment platform, (c) receiving a selection of at least one of one or more messaging accounts associated with the seller and one or more of a plurality of personal communication network accounts associated with the seller, (d) generating an address of a hosted website configured to display at least one of a photo relating to the item, a name of the item, a description of the item and a price of the item, (e) transmitting the generated address to at least one of the one or more messaging accounts and the one or more of the personal communication network accounts selected by the seller, (f) receiving an authorization to pay the seller from a consumer account having received the generated address through the at least one of the one or more messaging accounts and the one or more of the personal communication network accounts selected by the seller, and (g) transferring value from a consumer account to a seller account within the payment platform.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As used herein, the term "computer" and related terms, e.g., "computing device", are not limited to integrated circuits referred to in the art as a computer, but broadly refers to a microcontroller, a microcomputer, a programmable logic controller (PLC), an application specific integrated circuit, and other programmable circuits, and these terms are used interchangeably herein.

As used herein, the term "cloud computing" and related terms, e.g., "cloud computing devices" refers to a computer architecture allowing for the use of multiple heterogeneous computing devices for data storage, retrieval, and processing. The heterogeneous computing devices may use a common network or a plurality of networks so that some computing devices are in networked communication with one another over a common network but not all computing devices. In other words, a plurality of networks may be used in order to facilitate the communication between and coordination of all computing devices.

As used herein, the term "mobile computing device" refers to any of computing device which is used in a portable manner including, without limitation, smart phones, personal digital assistants ("PDAs"), computer tablets, hybrid phone/computer tablets ("phablet"), or other similar mobile device capable of functioning in the systems described herein. In some examples, mobile computing devices may include a variety of peripherals and accessories including, without limitation, microphones, speakers, keyboards, touchscreens, gyroscopes, accelerometers, and metrological devices. Also, as used herein, "portable computing device" and "mobile computing device" may be used interchangeably.

Approximating language, as used herein throughout the specification and claims, may be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The above-described embodiments of a method and system of selling items to personal contacts using personal messaging or personal communication network outlets provides a cost-effective and reliable means for quickly initiating merchant activities. More specifically, the methods and systems described herein facilitate receiving and formatting a sales listing and disseminating the listing to personal contacts of the seller. In addition, the above-described methods and systems facilitate receiving payment for the item on sale from consumers that have been contacted by the personal communication networks of the seller. As a result, the methods and systems described herein facilitate converting all-cash purchase transactions to purchase transactions that use the payment card network in a cost-effective and reliable manner.

This written description uses examples to describe the disclosure, including the best mode, and also to enable any person skilled in the art to practice the disclosure, including making and using any devices or systems and performing any incorporated methods. The patentable scope of the application is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A computer-based method for processing a purchase transaction between a seller and a consumer using at least one personal communication network, the method implemented using a payment platform computer device communicatively coupled to a payment card interchange network and the at least one personal communication network, the method comprising:
   receiving, by the payment platform computer device, from a seller computing device, registration data of a seller associated with the seller computing device, the registration data enabling the seller to use the payment platform computer device associated with the payment card interchange network, wherein the registration data includes contact information for the seller and an account number associated with the seller;
   receiving, by the payment platform computer device, a sale listing from the seller computing device, the sale listing relating to an item for sale using a transaction module associated with the payment platform computing device, wherein the sale listing includes a photo relating to the item, a name of the item, and a price of the item;
   receiving, by the payment platform computer device, from the seller computing device, a selection of a private sale field;
   storing, by the payment platform computer device within a memory device, the sale listing and the selection of the private sale field;
   receiving, by the payment platform computer device, an account selection of one or more of a plurality of personal communication network accounts associated with the seller, the account selection hosted on at least one of a social media site;
   generating, by the payment platform computer device, a URL address of a hosted website configured to display the sale listing including the photo relating to the item, the name of the item, and the price of the item;
   transmitting, by the payment platform computer device, the generated URL address to a particular person or group corresponding to contacts contained in the account selection;
   interacting, by the payment platform computer device in response to the selection of the private sale field, with a publication option of the at least one social media site to restrict dissemination of the sale listing to the particular person or group;
   receiving, by the payment platform computer device, an authorization to pay the seller from a consumer account having received the generated URL address through the one or more of the personal communication network accounts selected by the seller; and
   transferring, by the payment platform computer device via the payment card interchange network, value from the consumer account to the account number associated with the seller.

2. The computer-based method of claim 1, wherein receiving the sale listing relating to an item for sale further comprises receiving a description of the item.

3. The computer-based method of claim 1, wherein transmitting the generated URL address further comprises transmitting the generated URL address to the seller.

4. The computer-based method of claim 1, further comprising receiving, by the payment platform computer device, from a consumer, registration data for the consumer to use the payment platform computer device associated with a payment card interchange network.

5. The computer-based method of claim 4, wherein transferring value from the consumer account to the seller account comprises receiving value from the consumer.

6. The computer-based method of claim 1, further comprising generating, in response to a request from any of the particular person or group for the hosted website, a web page displaying the photo relating to the item, the name of the item, and the price of the item.

7. A personal media sales computing system comprising:
   a payment card interchange network comprising one or more processors communicatively coupled to one or more memory devices;
   a payment platform computing device configured to process a transaction between a seller and a consumer in a transaction that uses other than a payment card associated with said payment card network to complete the transaction; and
   a transaction module that is configured to operate in conjunction with the payment platform computing device to:
     receive, from a seller computing device associated with a seller, a sale listing relating to an item for sale, wherein the sale listing includes a photo relating to the item, a name of the item, and a price of the item;
     receive, from the seller computing device, a selection of a private sale field;
     store, within a memory device, the sale listing and the selection of the private sale field;
     generate a URL address of a hosted website configured to display the name of the item, the photo, and the price of the item;
     transmit the generated URL address to a particular person or group corresponding to contacts contained in one or more of a plurality of personal communication network accounts associated with the seller, the personal communication network accounts hosted on at least one social media site;
     interact, in response to the selection of the private sale field, with a publication option of the at least one social media site to restrict dissemination of sale listing to the particular person or group;
     receive an authorization to pay the seller from a consumer account having received the generated URL address through the one or more of the personal communication network accounts selected by the seller; and
     transfer value from the consumer account via the payment card interchange network to a seller payment platform account within the payment platform.

8. The personal media sales computing system of claim 7, wherein said transaction module is further configured to:
   receive seller information relating to a seller identity; and
   initiate a seller account based on the received seller identity.

9. The personal media sales computing system of claim 7, further comprising the seller computing device communicatively couplable to the payment card interchange network directly.

10. The personal media sales computing system of claim 7, wherein said transaction module is configured to transmit the received sale listing to the seller computing device.

11. The personal media sales computing system of claim 7, wherein said transaction module is configured to generate, in response to a request from any of the particular person or group for the hosted website, a sales web page that is associated with a public network address, the sales web page including the received sale listing.

12. A method of personal media sales comprising:
generating, at a seller computer device associated with a seller, a sale listing relating to an item for sale, wherein the sale listing includes a photo relating to the item, a name of the item, and a price of the item;
selecting, at the seller computer device, a private sale field;
selecting, at the seller computer device, an account selection including one or more of a plurality of personal communication network accounts associated with the seller, the account selection hosted on at least one social media site;
transmitting, by the seller computer device to a payment platform computer device, the sale listing, the account selection, and the selection of the private sale field, wherein the selection of the private field instructs the payment platform computer device to interact with a publication option of the at least one social media site to restrict dissemination of the sale listing to a particular person or group corresponding to contacts contained in the account selection;
receiving, at the seller computer device, a URL network address pointing to the sale listing, wherein the URL network address is generated by the payment platform computer device; and
transmitting, from the seller computer device, the received URL network address to the particular person or group via the account selection.

13. The method of claim 12, further comprising receiving an application configured to permit the seller computer device to communicate with a payment transaction system, the application configured to receive an indication of a payment of value to an electronic wallet system associated with the seller.

14. The method of claim 13, further comprising:
receiving, at the seller computer device, an identification of an account associated with the seller at the electronic wallet system; and
transmitting the identification of the account to the payment transaction system.

15. The method of claim 12, wherein receiving a URL network address pointing to the sale listing comprises receiving, at the seller computer device, a uniform resource locator (URL) of a web page containing the sale listing configured as a web page.

16. The method of claim 12, further comprising transmitting, by the seller computer device, registration data enabling the seller to use the payment platform computer device associated with a payment card interchange network.

* * * * *